US012773071B2

(12) United States Patent
Wang et al.

(10) Patent No.: US 12,773,071 B2
(45) Date of Patent: Oct. 27, 2026

(54) HEATABLE SCOOP

(71) Applicants: ShenZhen Beibei Intelligent Co., LTD, Shenzhen (CN); Shenzhen Zhaode Wisdom Technology Co. , Ltd., Shenzhen (CN)

(72) Inventors: Tinglei Wang, Shenzhen (CN); Shibin Lei, Shenzhen (CN); Suyan Bai, Shenzhen (CN); Yujun Zhou, Shenzhen (CN)

(73) Assignees: ShenZhen Beibei Intelligent Co., LTD, Shenzhen (CN); Shenzhen Zhaode Wisdom Technology Co. , Ltd., Shenzhen (CN)

( * ) Notice: Subject to any disclaimer, the term of this patent is extended or adjusted under 35 U.S.C. 154(b) by 305 days.

(21) Appl. No.: 18/809,236

(22) Filed: Aug. 19, 2024

(65) Prior Publication Data

US 2025/0098902 A1 Mar. 27, 2025

(30) Foreign Application Priority Data

Sep. 21, 2023 (CN) ........................ 202322569492.3

(51) Int. Cl.
*A47J 43/28* (2006.01)

(52) U.S. Cl.
CPC .................................. *A47J 43/282* (2013.01)

(58) Field of Classification Search
CPC ..................................................... A47J 43/282
See application file for complete search history.

(56) References Cited

U.S. PATENT DOCUMENTS

| | | | | | |
|---|---|---|---|---|---|
| 3,476,059 | A * | 11/1969 | Anderson | ................ | H05B 3/00 D7/681 |
| 3,513,290 | A * | 5/1970 | Burley | .................. | A47J 43/282 248/37.3 |
| 5,000,672 | A * | 3/1991 | Halimi | .................. | A47J 43/282 425/282 |
| D1,094,032 | S * | 9/2025 | Zhou | .............................. | D7/681 |
| 2005/0000372 | A1* | 1/2005 | Schulling | ................. | A23G 9/28 99/537 |
| 2008/0083717 | A1 | 4/2008 | Degrace et al. | | |
| 2018/0140140 | A1* | 5/2018 | Wilson | .................. | B26B 11/008 |
| 2019/0117022 | A1* | 4/2019 | Connally | ............. | A47J 43/282 |

(Continued)

FOREIGN PATENT DOCUMENTS

| | | | |
|---|---|---|---|
| CN | 203987345 | U | 12/2014 |
| CN | 108784231 | A | 11/2018 |

*Primary Examiner* — William A. Rivera

(57) ABSTRACT

A heatable scoop is provided. The heatable scoop includes: a handle, a spoon and a heating device; the spoon is connected to one end of the handle; and the heating device is disposed between the handle and the spoon; and the heating device includes a heating pad, a circuit board, a switch touch panel, a display screen, a temperature regulator, a rechargeable battery, a charging interface; the heating pad and the circuit board is provided in the spoon; and the switch touch panel, and the display screen, and the temperature regulator, and the rechargeable battery, and the charging interface is provided in the handle; and the heating pad, the switch touch panel, and the display screen, and the temperature regulator, and the charging battery is electrically connected to the circuit board. A heating pad is provided on the scoop, thus to reduce the force required to dig frozen food.

8 Claims, 5 Drawing Sheets

(56) References Cited

U.S. PATENT DOCUMENTS

| | | | | |
|---|---|---|---|---|
| 2020/0077843 | A1 * | 3/2020 | Nam | A47J 45/08 |
| 2023/0051216 | A1 * | 2/2023 | Wang | A47J 43/282 |
| 2023/0172396 | A1 * | 6/2023 | Kim | A47J 43/282 425/279 |
| 2025/0275652 | A1 * | 9/2025 | Qin | A47J 43/282 |
| 2026/0191362 | A1 * | 7/2026 | Wu | A47J 43/282 |

* cited by examiner

HEATABLE SCOOP

CROSS REFERENCE TO RELATED APPLICATIONS

This application claims foreign priority of Chinese Patent Application No. 202322569492.3, filed on Sep. 21, 2023 in the China National Intellectual Property Administration, the disclosures of all of which are hereby incorporated by reference.

TECHNICAL FIELD

The present disclosure relates to the technical field of scoop technology, in particular to a heatable scoop.

BACKGROUND

Existing ice cream scoops cannot be heated and require a lot of force to dig ice cream during use.

SUMMARY

The present disclosure provides a heatable scoop, to solve the technical problem that the existing scoops require a lot of force during use, to reduce the force required to dig frozen food.

The present disclosure provides a heatable scoop, includes a handle, a spoon and a heating device; the spoon is connected to one end of the handle; and the heating device is disposed between the handle and the spoon; and the heating device includes a heating pad, a circuit board, and a switch touch panel, and a display screen, and a temperature regulator, and a rechargeable battery, and a charging interface; and the heating pad and the circuit board is provided in the spoon; and the switch touch panel, and the display screen, and the temperature regulator, and the rechargeable battery, and the charging interface is provided in the handle; and the heating pad, the switch touch panel, and the display screen, and the temperature regulator, and the charging battery is electrically connected to the circuit board.

Furthermore, a handle trim piece is fixed on an outer surface of the handle; and the switch touch panel is fixed to the handle trim piece.

Furthermore, a spoon trim piece is fixed on an outer surface of a spoon body and close to a mouth of the spoon; and the heating pad is attached to the outer surface of the scoop body, and the heating pad is covered by the spoon trim piece.

Furthermore, a socket body located is provided at an end of the handle; the spoon includes the spoon body and a slot, the slot is located in the scoop body, and socket body is inserted into the slot.

Furthermore, the display screen is fixed to another end of the handle away from the spoon.

Furthermore, the heatable scoop includes an opening corresponding to the charging interface.

Furthermore, the heatable scoop includes a bracket, the bracket is configured to fix the rechargeable battery, and the bracket is fixed within the handle.

Furthermore, the temperature regulator is fixed to the bracket.

The present disclosure provides a heating pad on the scoop, thus to reduce the force required to dig frozen food.

DETAILED DESCRIPTION OF THE EMBODIMENTS

Figure 1:
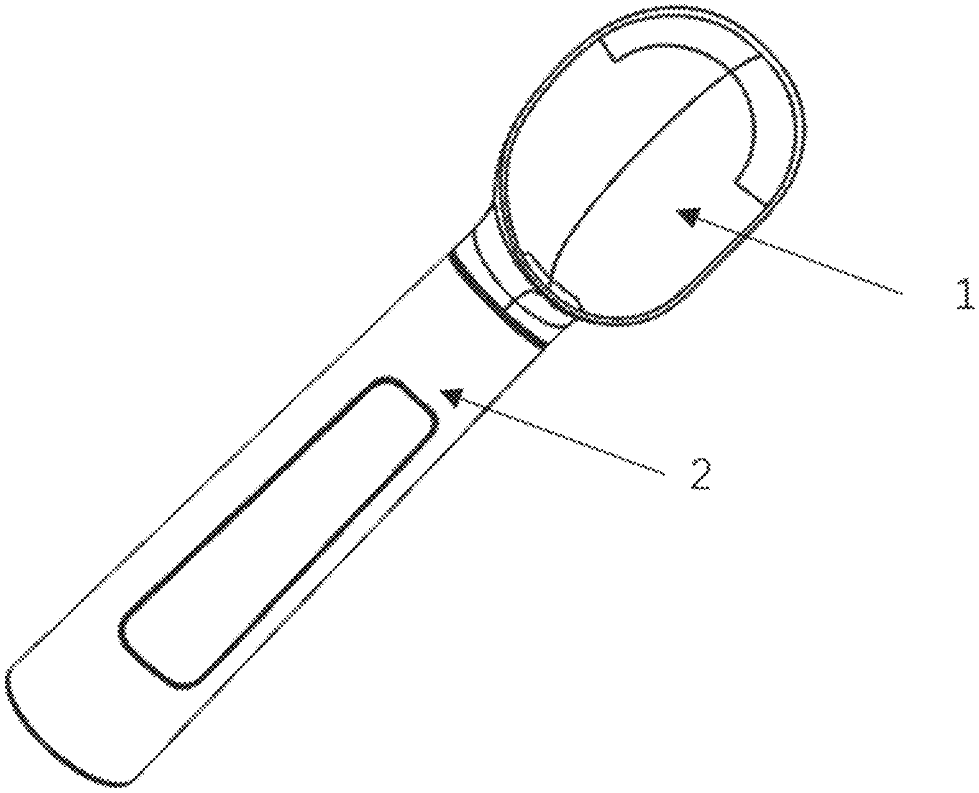
FIG. 1 is a schematic diagram of a heatable scoop according to an embodiment of the present disclosure.
Figure 2:
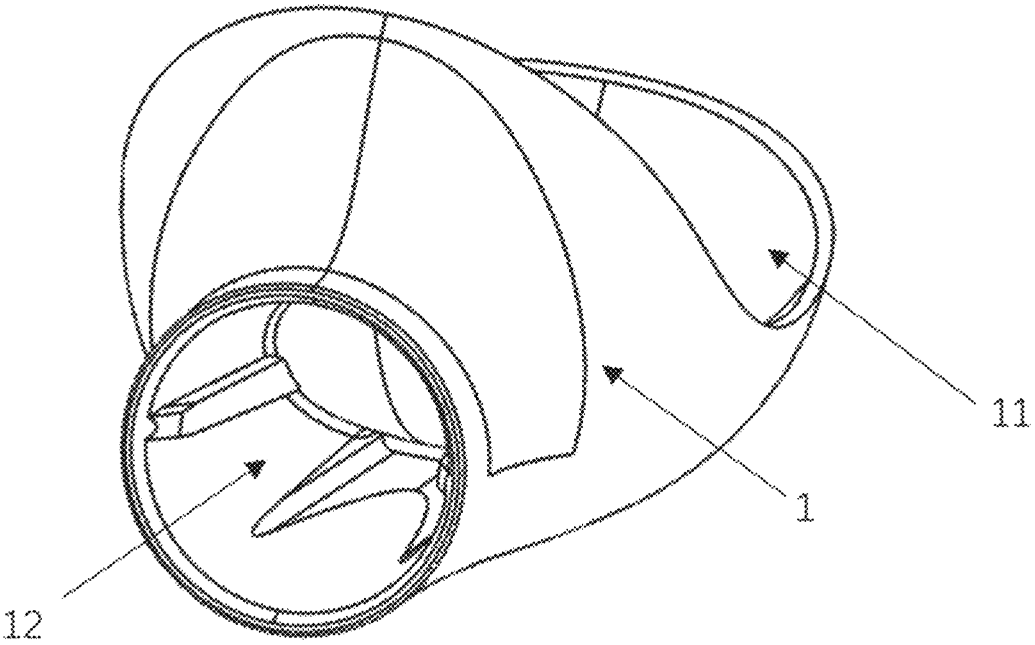
FIG. 2 is a schematic diagram of a spoon of the heatable scoop according to an embodiment of the present disclosure.
Figure 3:
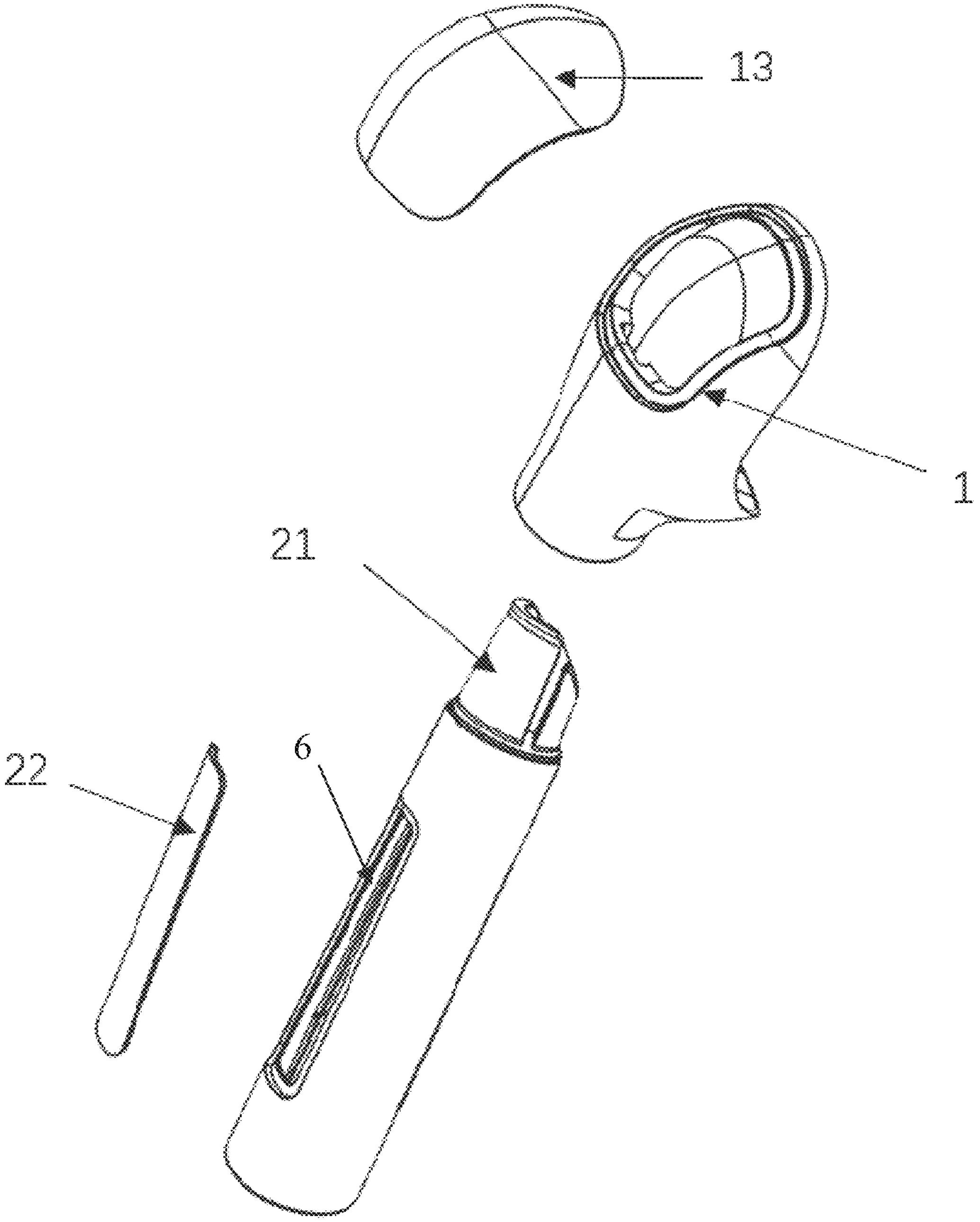
FIG. 3 is an exploded schematic diagram of the heatable scoop according to an embodiment of the present disclosure.

In order to make the purpose, technical solutions and advantages of this disclosure more clear, this disclosure is further explained in detail in combination with drawings and embodiments. It should be understood that the specific embodiments described herein are used only to explain this disclosure and not to limit the disclosure.

This disclosure discloses a heatable scoop, as shown in FIGS. 1 to 3 and FIG. 6, including a handle 2, a spoon 1 connected to an end of the handle 2, and a heating device 200 is disposed between the handle 2 and the spoon 1.

The handle 2 is provided with a socket body 21 located at one end and a handle trim piece 22 fixed to the outer surface. The spoon 1 includes a spoon body 11, a slot 12 located in the spoon body 11, and a spoon trim piece 13 which can be fixed outside the spoon body 11 and close to a mouth 10 of the spoon 1, which may be secured to the outer surface of the spoon body 11. The socket body 21 can be inserted and fixed in the slot 12 of the spoon 1 and secure the socket body 21 in the slot 12 with glue so that the spoon 1 is fixed to the handle 2.

Figure 4:
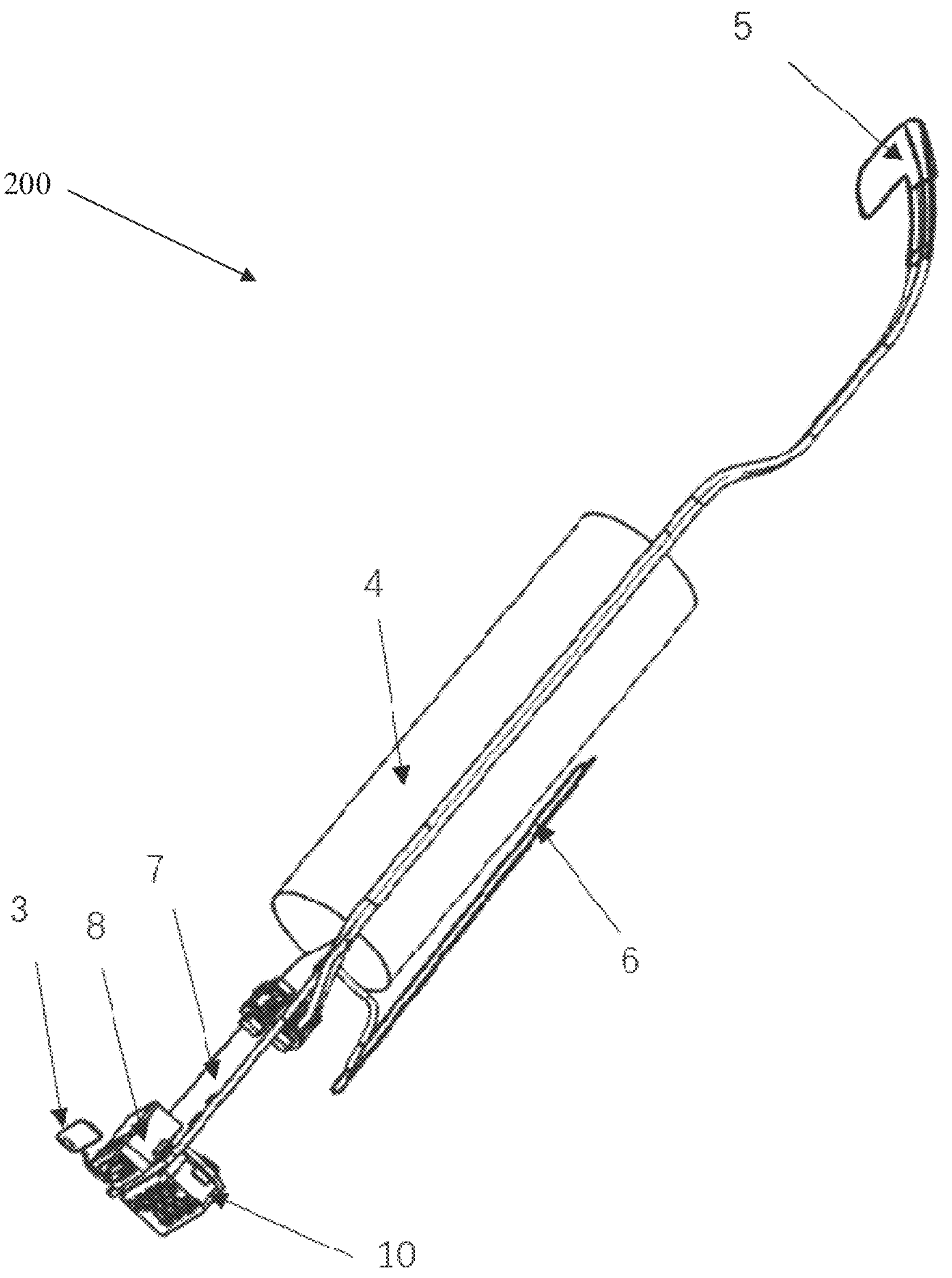
FIG. 4 is a schematic diagram of a heating device of the heatable scoop according to an embodiment of the present disclosure.
Figure 5:
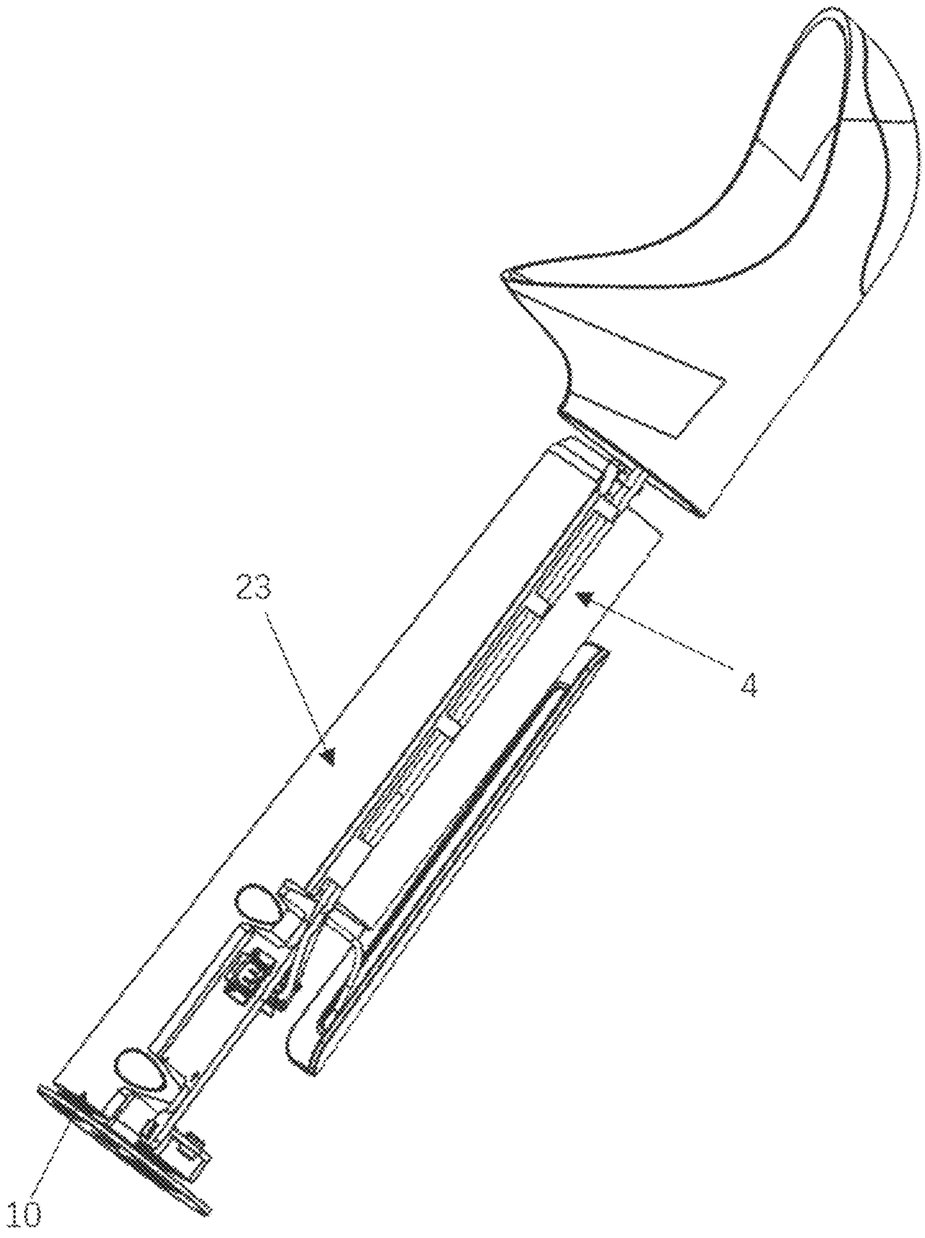
FIG. 5 is a schematic diagram of the heating device and the spoon of the heatable scoop according to an embodiment of the present disclosure
Figure 6:
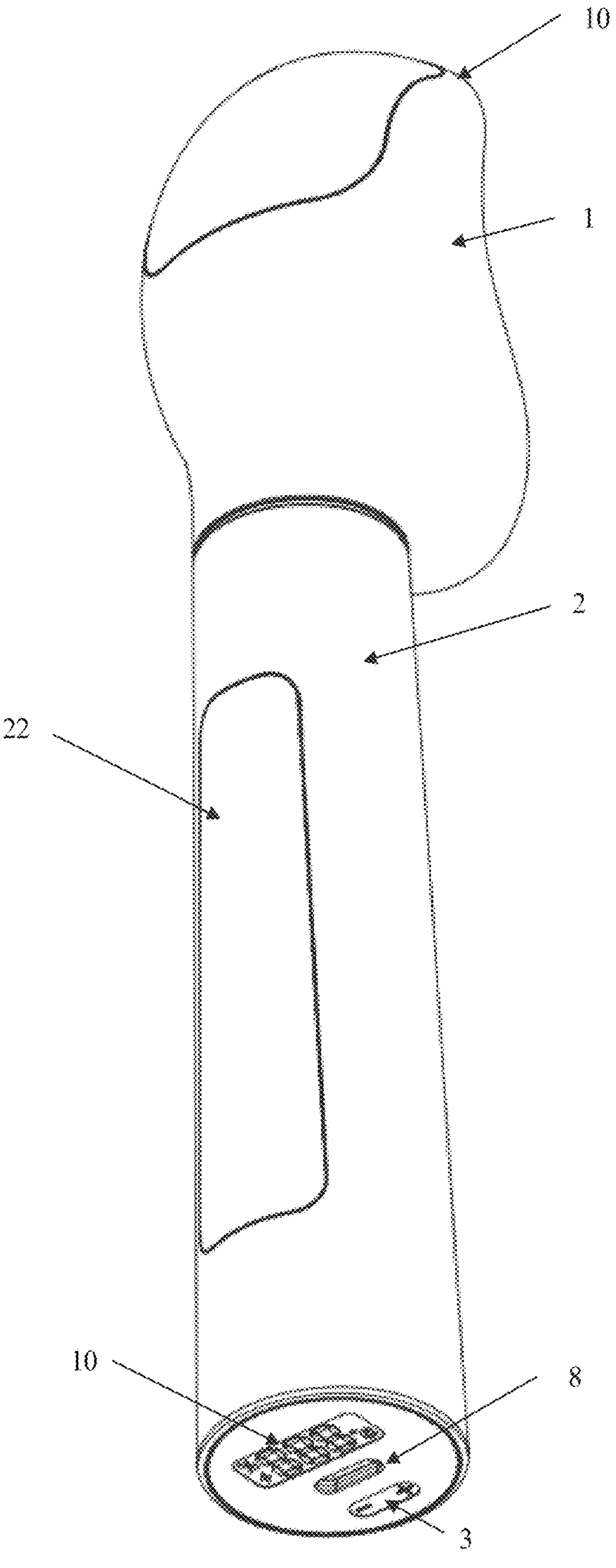
FIG. 6 is another schematic diagram of a heatable scoop according to an embodiment of the present disclosure.

As shown in FIGS. 4 and 5, the heating device 200 includes a heating pad 5, a circuit board 7 located in the spoon 1, and a switch touch panel 6 fixed in the handle 1, a display 10, a temperature regulator 3, a charging battery 4, and a charging interface 8, wherein the heating pad 5, the switch touch panel 6, and the display 10, and the temperature regulator 3, and the charging battery 4 are electrically connected to the circuit board 7.

The heating sheet 5 is attached to the outer surface of the spoon body 11 by a double sided adhesive tape, and the heating sheet 5 is conversed by the spoon trim piece 13. The switch touch panel 6 is secured in the handle trim piece 22.

The display screen 10 may display a temperature and battery level. The display screen 10 may display the temperature of adjusted by the temperature regulator 3. The display screen 10 is fixed at another end of the handle 2 away from the spoon, with an opening corresponding to the charging interface 8 (not shown).

The heatable scoop also includes a bracket 23, configured for fixing the charging battery 4, which is fixed to the handle 2, and the temperature regulator 3 is fixed to the bracket 23 by a double sided adhesive tape.

When in use, a start of the switch touch panel 6 is realized by the handle trim piece 22, and then the temperature of the temperature regulator 3 is adjusted through the display screen 10, the circuit board 7 transmits the heat to the heating sheet 5, and the heating sheet 5 heats the spoon body 11 of the spoon 1, thus to save labor when digging the ice cream or other frozen objects.

The disclosure solves by adding a heating device to the mouth of the spoon, thus reducing the force required for digging.

The above are only better embodiments of the disclosure, and neither the words nor the drawings can limit the protection scope of the present disclosure. Although the disclosure has been as above in preferred embodiments, it is not used to limit the disclosure. Any technician familiar with the technical field. Within the scope of the technical scheme of the present disclosure. When an equivalent embodiment can be slightly modified or modified as equivalent by using the technical solutions content disclosed above it is not separated from the content of the disclosure, any simple modification, equivalent change and modification of the above embodiments according to the technical solutions of the disclosure, all of these remain within the scope of the present disclosure.

What is claimed is:

1. A heatable scoop, wherein, comprising a handle, a spoon and a heating device;

wherein the spoon being connected to one end of the handle; and the heating device being disposed between the handle and the spoon; and wherein the heating device includes a heating pad, a circuit board, and a switch touch panel, and a display screen, and a temperature regulator, and a rechargeable battery, and a charging interface; and the heating pad and the circuit board being provided in the spoon; and the switch touch panel, and the display screen, and the temperature regulator, and the rechargeable battery, and the charging interface being provided in the handle; and wherein the heating pad, the switch touch panel, and the display screen, and the temperature regulator, and the charging battery being electrically connected to the circuit board.

2. The heatable scoop of claim 1, wherein a handle trim piece is fixed on an outer surface of the handle; and the switch touch panel is fixed to the handle trim piece.

3. The heatable scoop of claim 1, wherein a spoon trim piece is fixed on an outer surface of a spoon body and close to a mouth of the spoon; and the heating pad is attached to the outer surface of the scoop body, and the heating pad is covered by the spoon trim piece.

4. The heatable scoop of claim 1, wherein a socket body located is provided at an end of the handle;

the spoon comprises the spoon body and a slot, the slot is located in the scoop body, and socket body is inserted into the slot.

5. The heatable scoop of claim 1, wherein the display screen is fixed to another end of the handle away from the spoon.

6. The heatable scoop of claim 1, wherein the heatable scoop comprises an opening corresponding to the charging interface.

7. The heatable scoop of claim 1, wherein the heatable scoop comprises a bracket, the bracket is configured to fix the rechargeable battery, and the bracket is fixed within the handle.

8. The heatable scoop of claim 7, wherein the temperature regulator is fixed to the bracket.

* * * * *